United States Patent [19]

Mizumura et al.

[11] 4,255,553
[45] Mar. 10, 1981

[54] POWDER COATING COMPOSITION

[75] Inventors: Yutaka Mizumura, Shiga; Iori Naito; Hideo Miyake, both of Otsu, all of Japan

[73] Assignee: Toyo Boseki Kabushiki Kaisha, Japan

[21] Appl. No.: 45,521

[22] Filed: Jun. 4, 1979

[51] Int. Cl.$^3$ .................. C08G 59/42; C08G 81/00
[52] U.S. Cl. .................. 528/93; 525/55; 525/119; 525/438; 525/533; 528/114; 528/341
[58] Field of Search .................. 528/114, 341, 93; 525/55, 119, 533, 438

[56] References Cited

U.S. PATENT DOCUMENTS

| | | | |
|---|---|---|---|
| 2,712,535 | 7/1955 | Fisch | 260/45.4 |
| 2,928,807 | 3/1960 | Belanger | 260/47 |
| 2,928,809 | 3/1960 | Hicks | 260/47 |
| 3,555,111 | 1/1971 | Benham | 260/835 |
| 3,989,679 | 11/1976 | Sluis et al. | 260/78.41 |
| 4,026,862 | 5/1977 | Smith et al. | 260/37 EP |

*Primary Examiner*—Earl A. Nielsen
*Attorney, Agent, or Firm*—Jones, Tullar & Cooper

[57] ABSTRACT

A powder coating composition comprising:
(a) a compound having at least two epoxy groups in the molecule;
(b) a compound having at least two carboxyl groups in the molecule; and
(c) a compound of the formula:

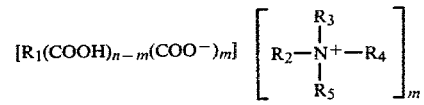

wherein m and n are each an integer of $1-10^5$ provided that $m \leq n$; $R_1$ is a residue of a mono or polybasic carboxylic acid; $R_2$, $R_3$, $R_4$ and $R_5$ are, the same or different, each an unsubstituted or substituted $C_{1-30}$ alkyl, $C_{6-10}$ cycloalkylalkyl, $C_{5-8}$ cycloalkyl, $C_{6-20}$ aryl or $C_{7-30}$ aralkyl or at least two of them many form together with nitrogen atom a saturated or unsaturated heterocyclic group, said composition being able to be thermoset at low temperature and form a paint film having excellent surface smoothness without browning of the film.

15 Claims, No Drawings

POWDER COATING COMPOSITION

The present invention relates to a powder coating composition. More particularly, it relates to a resinous composition for powder coating, which can be thermoset at a low temperature and form a paint film having excellent surface smoothness.

Since powder coating involves no organic solvent, a powder coating composition is expected to be useful as a paint which can save resources and prevent environmental pollution. However, powder coating has some disadvantages. For example, a powder coating composition requires a high baking temperature in the application thereof and surface smoothness of a resulting paint film is insufficient. Therefore, the use of powder coating is restricted.

In order to extend the use of powder coating, it has been strongly desired to lower the baking temperature in the application of a powder coating composition since, when the baking temperature is too high, it is not economical and, further, there occur some problems such as browning of a paint film, deformation of a steel plate to be coated, fluxing of a soldered part in an article to be coated. To lower the baking temperature, it is necessary to accelerate the thermo-setting reaction rate of a powder coating composition to be used, but, when the thermosetting reaction rate is too high, fluidity of the composition in a molten state is reduced and it becomes difficult to form a smooth film. In powder coating, it is desirable that the powder coating composition is molten by heating at an initial stage of the film-forming step and then, after a smooth film is formed, the thermosetting reaction thereof proceeds. Therefore, the choice of a resin, a curing agent and a thermosetting reaction catalyst to be used in the powder coating composition are important factors. Particularly, the choice of the thermosetting reaction catalyst has an important effect on film properties since the catalyst keeps the balance between melting and fluidization of the composition by heating and progress of thermo-setting reaction during the film-forming step.

It has been well known that the reaction of epoxy groups and carboxyl groups can be used in thermosetting a powder coating composition and this type of the reaction is utilized in acrylic or polyester powder coating compositions. However, many of these compositions have disadvantages. They require severe curing conditions, for example 200° C. for more than 20 minutes, or they form a paint film having inferior surface smoothness even if they can be thermoset at a low temperature, for example 180° C. for about 20 minutes. As a catalyst for the reaction of epoxy groups and carboxyl groups, tertiary nitrogen compounds, such as dimethylbenzylamine, 2-methylimidazole or triethylenediamine, a quaternary ammonium salt such as tetraethylammonium chloride and the like are generally known. However, when these compounds are used in powder coating compositions, various problems occur in practice. For example, these compounds do not adequately lower the thermo-setting temperature; they cause poor surface smoothness in a paint film; and moreover, they cause browning of a paint film. Therefore, it has been strongly desired to solve these problems.

We have intensively studied how to solve these problems in the conventional powder coating compositions and have found that compounds of the formula [I] as mentioned hereinafter are suitable as a reaction catalyst of epoxy groups and carboxyl groups in a powder coating composition and that the composition containing the same can form a paint film having excellent film properties which can not be attained by any conventional composition.

The main object of the present invention is to provide a powder coating composition which can be thermoset at a low temperature and form a paint film having excellent surface smoothness. This and other objects and advantages of the present invention will be apparent from the following description.

The present invention provides a powder coating composition which comprises:

(a) a compound having at least two epoxy groups in the molecule;

(b) a compound having at least two carboxyl groups in the molecule; and (c) a compound of the formula:

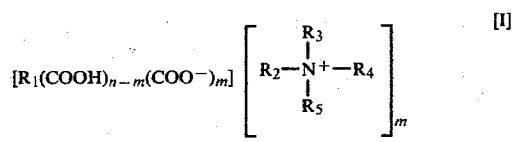

[I]

wherein m and n are each an integer from 1 to $10^5$ provided that $m \leq n$; $R_1$ is a residue of a mono or polybasic carboxylic acid (the number of the carboxyl groups $n = 1$ to $10^5$); and $R_2$, $R_3$, $R_4$ and $R_5$ are, the same or different, each an alkyl group having 1 to 30 carbon atoms, a cycloalkylalkyl group having 6 to 10 carbon atoms, a cycloalkyl group having 5 to 8 carbon atoms, an aryl group having 6 to 20 carbon atoms, or an aralkyl group having 7 to 30 carbon atoms, or at least two of $R_2$ to $R_5$ may form together with the nitrogen atom a saturated or unsaturated heterocyclic group and, optionally, the alkyl group of $R_2$ to $R_5$ may be substituted with a halogen, nitro, an alkoxy having 1 to 4 carbon atoms or furyl and the cycloalkyl moiety or group, aryl group and aralkyl group of $R_2$ to $R_5$ may be substituted with a halogen, nitro, an alkyl having 1 to 4 carbon atoms, an alkoxy having 1 to 4 carbon atoms or furyl. In the present invention, the thermosetting temperature of the composition can be lowered without any deterioration of surface smoothness of the resulting paint film due to addition of the compound of the formula [I]. Moreover, browning of the resulting paint film, which is usually caused by addition of a conventional quaternary ammonium salt catalyst, can be prevented.

The compounds having at least two epoxy groups in the molecule used in the present invention have a molecular weight of 200 to 5,000 and an epoxy equivalent of not more than 2,500. Examples of these compounds are as follows:

(1) a reaction product of an aromatic polyhydroxy compound having 6 to 27 carbon atoms and epichlorohydrin, such as a compound of the formula

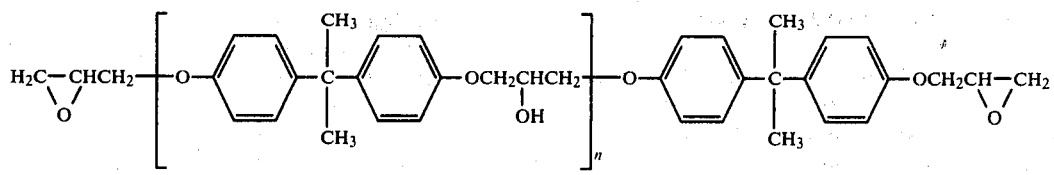

wherein n is 0 to 15 (e.g. Epikote 828, 1001, 1004, and 1007 produced by Shell Chemical Co., Ltd.), hydroquinone diglycidyl ether, a polyglycidyl ether of phenolic novolak (e.g. DEN 438 produced by Dow Chemical Co.) and the like;

(2) a reaction product of an alicyclic polyhydroxy compound having 6 to 16 carbon atoms and epichlorohydrin such as diglycidyl ether of 2,2-bis(4-hydroxycyclohexyl)propane, diglycidyl ether of 1,4-cyclohexanedimethanol and the like;

(3) a reaction product of aliphatic polyhydroxy compound having 2 to 22 carbon atoms and epichlorohydrin such as ethylene glycol diglycidyl ether, a diglycidyl ether of polyethylene glycol having a molecular weight of 82 to 500 and the like;

(4) a condensation product of an aromatic polycarboxylic acid having 8 to 22 carbon atoms and epichlorohydrin such as diglycidyl terephthalate, diglycidyl isophthalate, 2,6-diglycidyl naphthalate, triglycidyl trimellitate and the like;

(5) a reaction product of an aliphatic polycarboxylic acid having 4 to 36 carbon atoms and epichlorohydrin such as diglycidyl adipate, diglycidyl sebacate, diglycidyl ester of a dimer acid, diglycidyl succinate and the like;

(6) a reaction product of an alicyclic polycarboxylic acid having 8 to 20 carbon atoms and epichlorohydrin such as diglycidyl ester of 1,4-cyclohexanedicarboxylic acid and the like;

(7) a reaction product of a hydroxy-substituted aromatic carboxylic acid having 7 to 28 carbon atoms and epichlorohydrine such as glycidyl p-glycidyloxybenzoate and the like;

(8) a nitrogen-containing epoxy compound, such as triglycidyl isocyanurate, 1,3-diglycidyl-5,5-dimethylhydantoin and the like; and (9) a polyepoxy ester having an epoxy equivalent of 180 to 2,500 produced by reacting an oligo ester of an aromatic polycarboxylic acid and glycol having an acid value of 25 to 6,000, and a molecular weight of 350 to 3,000, or a polycarboxylic acid, the basicity thereof being not less than 2, having 4 to 12 carbon atoms with one of the polyepoxy compounds in the above (1) to (8) (preferably that having an epoxy equivalent of not more than 250).

The epoxy compound used in the present invention is not limited to the above described compounds (1) to (9). An epoxy compound produced by increasing a molecular weight to elevate its softening temperature according to a known method or an acrylic resin having not less than two epoxy groups in the molecule produced by, for example, copolymerizing glycidyl methacrylates according to a known method can be also used in the present invention. However, it is preferable to use one of the above described compounds (1), (4), (7) and (8) as the epoxy compound in the present invention.

The compound having at least two carboxyl groups in the molecule includes an aliphatic dicarboxylic acid having 4 to 36 carbon atoms (e.g. adipic acid, sebacic acid, decamethylenedicarboxylic acid, etc.) or a carboxyl groups-containing polyester or acrylic resin having a molecular weight of 1,000 to 7,000 and an acid value of not less than 20. The polyester resin consists of a dicarboxylic acid componet, a glycol component and optionally a polyfunctional component. The dicarboxylic acid component is one or more compounds selected from an aromatic dicarboxylic acid having 8 to 22 carbon atoms, such as terephthalic acid, isophthalic acid, 2,6-naphthalenedicarboxylic acid and the like; and aliphatic dicarboxylic acid having 4 to 36 carbon atoms, such as succinic acid, adipic acid, sebacic acid, dodecanedicarboxylic acid and the like; and an alicyclic dicarboxylic acid having 8 to 18 carbon atoms, such as hexahydrophthalic acid and the like. The glycol component is one or more compounds selected from an aliphatic glycol having 2 to 22 carbon atoms such as ethylene glycol, propylene glycol, neopentyl glycol and the like; an aromatic glycol having 6 to 27 carbon atoms such as 2,2-bis(4-hydroxyphenyl)propane, an alkylene oxide adduct thereof such as ethylene oxide adduct of 2,2-bis(4-hydroxyphenyl)propane; and an alicyclic glycol having 6 to 16 carbon atoms, such as 2,2-bis(4-hydroxycyclohexyl)propane, 1,4-cyclohexanedimethanol and the like. As the suitable examples of the polyfunctional component, there may be one or more compounds selected from a polycarboxylic acid, the basicity thereof having not less than 3, such as trimetallic acid, pyromellitic acid and the like; and a polyol, the number of alcoholic hydroxy groups thereof being not less than 3, such as trimethylolpropane, trimethylolethane, glycerin, pentaerythritol and the like. The acrylic resin having an acid value of not less than 20 is a homopolymer or a copolymer of acrylic acid and/or methacrylic acid. A copolymer produced by copolymerization of acrylic acid and/or methacrylic acid and one or more of other vinyl monomers, such as acrylates (e.g. methyl acrylate, ethyl acrylate), methacrylates (e.g. methyl methacrylate, ethyl methacrylate), styrene and the like can also be used. As the carboxyl groups-containing compound used in the present invention, the above polyester resin is preferable.

In the compound of the formula [I], $R_1$ represents a residual group wherein carboxy group(s) are removed from a mono or polybasic carboxylic acid (the number of the carboxyl groups $n = 1$ to $10^5$). Suitable examples of the monocarboxylic acid are an aromatic monocarboxylic acid having 7 to 21 carbon atoms, which is optionally substituted with hydroxy, a halogen, nitro, an alkoxy having 1 to 4 carbon atoms, such as benzoic acid, hydroxybenzoic acid, chlorobenzoic acid, nitrobenzoic acid, methoxybenzoic acid, naphthalenecarboxylic acid and the like; and a saturated or unsaturated aliphatic or alicyclic monocarboxylic acid having 1 to 30 carbon atoms, which is optionally substituted with hydroxy, a halogen, a keto, phenyl, such as formic acid, acetic acid, chloroacetic acid, propionic acid, butylic acid, valeric acid, lactic acid, acrylic acid, methacrylic acid, crotonic acid, cinnamic acid, hydroxpyropionic acid, levulinic acid, acetoacetic acid, phenylacetic acid and the like. Suitable examples of the polybasic carboxylic acid are an aromatic dicarboxylic acid having 8 to 22 carbon atoms, which is optionally substituted with a halogen, an alkyl having 1 to 4 carbon atoms, such as terephthalic acid, isophthalic acid, orthophthalic acid, 2,6-naphthalenedicarboxylic acid, methylterephthalic acid, tetrachlorophthalic acid, tetrabromophthalic acid, 4,4'-diphenyldicarboxylic acid, bis(4,4'-carboxyphenyl-)oxide and the like; a saturated or unsaturated aliphatic or alicyclic dicarboxylic acid having 4 to 36 carbon atoms, such as succinic acid, adipic acid, sebacic acid, fumaric acid, itaconic acid, dodecanedicarboxylic acid tetrahydrophthalic acid, 1,4-cyclohexanedicarboxylic acid, hydroxyglutaric acid, and the like; a tribasic carboxylic acid, such as trimellitic acid, trimescic acid, citric acid and the like; a tetrabasic carboxylic acid, such as pyromellitic acid, benzophenonetetracarboxylic acid, ethylene glycol bis(trimellitate), neopentyl glycol trimellitate, 1,2,3,4-butanetetracarboxylic acid and the like; an oligo ester having an acid value of not less than 20 of a polybasic carboxylic acid and a glycol; a polyacrylic acid; a polymethacrylic acid; and the like. As the mono or polybasic carboxylic acid, that having 1 to 10 carboxyl groups, paticularly, 1 to 4 carboxyl groups is preferable. Among these, particularly, an aromatic monocarboxylic acid, such as benzoic acid or hydroxybenzoic acid; and aliphatic monocarboxylic acid, such as acetic acid or propionic acid; an aromatic dicarboxylic acid, such as terephthalic acid, isophthalic acid or orthophthalic acid; and a tribasic carboxylic acid such as trimellitic acid are preferable.

$R_2$, $R_3$, $R_4$, and $R_5$ are, the same or different, each an unsubstituted or substituted alkyl having 1 to 30 carbon atoms, a cycloalkylalkyl having 6 to 10 carbon atoms, a cycloalkyl having 5 to 8 carbon atoms, an aryl having 6 to 20 carbon atoms or an aralkyl having 7 to 30 carbon atoms, or at least two of them may form together with the nitrogen atom to which they are attached a saturated or unsaturated heterocyclic group, such as pyridyl and piperidyl. The substituent for the alkyl group is a halogen, nitro, an alkoxy having 1 to 4 carbon atoms or furyl. The substituent for the cycloalkyl, aryl or aralkyl group is a halogen, nitro, an alkyl having 1 to 4 carbon atoms, an alkoxy having 1 to 4 carbon atoms or furyl. Examples of the alkyl group are methyl, ethyl, propyl, chloroethyl, isopropyl, n-butyl, isobutyl, sec-butyl, tert-butyl, amyl, isoamyl, hexyl, octyl, decyl, dodecyl, stearyl, furfuryl and the like. Particularly, methyl or ethyl is preferable. Suitable example of the cycloalkylalkyl group is cyclohexylmethyl. Suitable example of the cycloalkyl group is cyclohexyl. Suitable examples of the aryl group are phenyl, tolyl, nitrophenyl and the like. Suitable examples of the aralkyl group are benzyl, methylbenzyl and the like.

In the formula [I], m means the degree of neutralization of the carboxylic acids therein and m is an integer of not more than n. And at least one carboxyl group formes the quaternary ammonium salt and, thereby, the degree of neutralization can be controlled on occasion.

Examples of the compound of the formula [I] are tetramethylammonium acetate, tetraethylammonium acetate, tetra-n-proplyammonium acetate, tetraisopropylammonium acetate, tetra-n-butylammonium acetate, tetramethylammonium propionate, tetraethylammonium propionate, tetra-n-propylammonium propionate, tetraisopropylammonium propionate, tetra-n-butylammonium propionate, tetramethylammonium benzoate, tetraethylammonium benzoate, tetra-n-propylammonium benzoate, tetraisopropylammonium benzoate, tetra-n-butylammonium benzoate, mono(tetramethylammonium) adipate, mono(tetraethylammonium) adipate, mono(tetra-n-propylammonium) adipate, mono(tetraisopropylammonium) adipate, mono(tetra-n-butylammonium) adipate, bis(tetramethylammonium) adipate, bis-(tetraethylammonium) adipate, bis(tetra-n-propylammonium) adipate, bis(tetraisopropylammonium) adipate, bis(tetra-n-butylammonium) adipate, trimethylbenzylammonium acetate, trimethylphenylammonium acetate, trimethylisobutylammonium acetate, laurylpyridinium acetate, trimethylbenzylammonium propionate, trimethylphenylammonium propionate, trimethylisobutylammonium propionate, trimethylbenzylammonium benzoate, triethylphenylammonium benzoate, trimethylisobutylammonium benzoate, trimethylstearylammonium benzoate, mono-(tetramethylammonium) terephthalate, mono(tetraethylammonium) terephthalate, mono(tetra-n-propylammonium) terephthalate, mono(tetraisopropylammonium) terephthalate, mono(tetra-n-butylammonium) terephthalate, bis(tetramethylammonium) terephthalate, bis(tetraethylammonium) terephthalate, bis(tetra-n-propylammonium) terephthalate, bis(tetraisopropylammonium) terephthalate, bis(tetra-n-butylammonium) terephthalate, mono-(tetramethylammonium) isophthalate, mono(tetraethylammonium) isophthalate, mono(tetra-n-propylammonium) isophthalate, mono-(tetraisopropylammonium) isophthalate, mono(tetra-n-butylammonium) isophthalate, bis(tetramethylammonium) isophthalate, bis(tetraethylammonium) isophthalate, bis(tetra-n-propylammonium) isophthalate, bis(tetraisopropylammonium) isophthalate, bis(tetra-n-butylammonium)isophthalate, mono(tetramethylammonium) orthophthalate, mono(tetraethylammonium) orthophthalate, mono(tetra-n-propylammonium) orthophthalate, mono(tetraisopropylammonium) orthophthalate, mono(tetra-n-butylammonium) orthophthalate, bis(tetramethylammonium) orthophthalate, bis(tetraethylammonium) orthophthalate, bis-(tetra-n-propylammonium) orthophthalate, bis(tetraisopropylammonium) orthophthalate, bis(tetra-n-butylammonium) orthophthalate, mono(trimethylbenzylammonium) terephthalate, mono(trimethylphenylammonium) terephthalate, mono(trimethylisobutylammonium) terephthalate, mono(trimethylstearylammonium) terephthalate, bis(trimethylbenzylammonium) terephthalate, bis(trimethylphenylammonium) terephthalate, bis(trimethylisobutylammonium) terephthalate, mono(trimethylbinzylammonium) isophthalate, mono(trimethylphenylammonium) isophthalate, mono(trimethylstearylammonium) isophthalate, bis-(trimethylbenzylammonium) isophthalate, bis(trimethylphenylammonium) isophthalate and the like. Particularly, tetramethylammonium salt, tetraethylammonium salt, tetra-n-propylammonium salt, tetraisopropylammonium salt, tetra-n-butylammonium salt or trimethylbenzylammonium salt of terephthalic acid or isophthalic acid is preferable. The compounds of the formula [I] can be prepared by a known method for the preparation of a quaternary ammonium salt.

The amount of the catalyst of the formula [I] to be added to the composition of the present invention is 0.01 to 10% by weight, preferably, 0.05 to 5% by weight based on the amount of the epoxy compound to be used. When the amount is less than 0.01% by weight, excellent thermosetting properties can hardly be expected. To the contrary, when the amount is more than 10% by weight, a paint film having excellent surface smoothness can not be obtained.

The ratio of the epoxy compound to the carboxyl groups-containing compound in the composition can be appropriately selected so that the ratio of the epoxy groups to the carboxyl groups becomes within the range of 0.5<epoxy groups/carboxyl groups <2.0, preferaly, 0.7<epoxy groups/carboxyl groups<1.3. When the ratio is out of the above range, a paint film having excellent thermosetting properties can hardly be obtained.

The powder coating composition of the present invention may further contain known additives such as a leveling agent, a pigment, a weathering agent and the like. The composition can be prepared by a conventional method, for example, the epoxy compound, the carboxyl groups-containing compound, the catalyst of the formula [I] and other additives are molten and mixed at 80° to 140° C., and after cooling, the resulting solidified material is ground or pulverized to obtain the powder coating composition of the present invention.

The powder coating composition of the present invention can be applied to various articles by a conventional method such as flame spray coating, fluidized bed coating, electrostatic spray coating and the like.

The powder coating composition of the present invention can provide a paint film having superior surface smoothness and film properties to those obtained by using a conventional composition containing a conventional catalyst for curing an epoxy compound. Moreover, browning of a paint film at baking hardly occurs when the powder coating composition of the present invention is used.

The following examples illustrate the present invention but are not to be construed as limiting the scope thereof. In the examples, "part" is shown by weight.

The amount (mol %) of each component in the polyester resin used was determined by NMR analysis. Softening point was determined by using a fully-automatic melting point determination device (MODEL FP-1 produced by METLER Co., Ltd.). Molecular weight was determined by using a molecular weight determination device (Type 115 produced by Hitachi Seisakusho, using chloroform as the solvent). Acid value was determined by weighing precisely 0.3 to 0.4 g of a sample of the resin used, dissolving it in 20 ml of chloroform and then titrating the resulting solution with 0.1 N potassium hydroxide-methanol (using phenolphthalein as an indicator).

Smoothness and browning were evaluated on the results of observation of the surface of the resulting film with the naked eye as follows:
O: Excellent;
Δ: Average;
×: Inferior.

Gloss was determined by light reflector coefficient (%) at 60° reflection. Erichsen test was carried out according to JIS Z-2247, and Du Pont impact test (½″, 1 kg was carried out according to JIS K-5400.

EXAMPLE 1

Into a stainless steel autoclave equipped with a stirrer, a thermometer and a partial reflex condenser were added terephthalic acid (830 parts), ethylene glycol (322 parts), neopentyl glycol (541 parts) and dibutyltin oxide (1.0 part) and the mixture was reacted at 230 to 240° C. for 2 hours under the pressure of 3 kg/cm² (gauge pressure). To the reaction mixture was added terephthalic acid (730 parts) and reacted at 200° to 250° C. for 10 hours. Further, trimellitic anhydride (115 parts) was added thereto and the mixture was reacted at 230° to 240° C. for one hour to obtain a pale yellowish transparent polyester resin (A). The polyester resin (A) had a molecular weight of 3,500, a softening point of 85° C. and an acid value of 42. NMR analysis showed as follows:

| Polycarboxylic acid components | |
|---|---|
| Terephthalic acid | 94 mol % |
| Trimellitic acid | 6 mol % |
| Polyol components | |
| Ethylene glycol | 50 mol % |
| Neopentyl glycol | 50 mol % |

The above-obtained polyester resin (A) (600 parts), Epikote 1004 (produced by Shell Chemical Co., Ltd.) (400 parts), rutile titanium dioxide (400 parts), Polyflow-S (a flow agent produced by Kyoeisha Yushikagaku Kogyo Co., Ltd.) (5 parts) and bis(tetraethylammonium) terephthalate (3 parts) were roughly pulverized and mixed by Henschel mixer and then compounded by a twin extruder at 100° to 130° C. After cooling, the homogeneous compounded compositions was finely pulverized and passed through a 100 mesh screen to obtain a powder coating composition.

The powder coating composition thus obtained was applid onto a mild steel plate by using Ransburg type electrostatic powder sprayer and baked at 180° C. for 20 minutes to obtain a paint film having 50 to 70μ in thickness.

The properties of the resulting film are shown in Table 3.

EXAMPLE 2 to 5

In the same manner as described in Example 1, there were obtained polyester resins (B) to (D). NMR analyses, molecular weights, softening points and acid values thereof are shown in Table 1. According to the procedure of Example 1, each of the polyester resins (B) to (D) was compounded with the epoxy resin and the catalyst listed in Table 2 and the resulting powder coating composition was applied onto a mild steel plate and baked. The properties of the film thus obtained are also shown in Table 3.

COMPARATIVE EXAMPLES 1 TO 4

According to the procedure of Example 1 except that tetraethylammonium chloride, tetramethylammonium bromide or dimethylbenzylamine was used as a reaction catalyst instead of the catalyst of the formula [I], there was obtained a powder coating composition. The resulting composition was applied onto a mild steel plate and baked in the same manner as described in Example 1. The properties of the resulting film are also shown in Table 3.

TABLE 1

| Polyester resins | | A | B | C | D |
|---|---|---|---|---|---|
| Polycarbodylic acid components | | | | | |
| Terephthalic acid | (mol %) | 94 | 60 | 90 | 85 |
| Isophthalic acid | (mol %) | — | 20 | — | — |
| Trimellitic acid | (mol %) | 6 | 20 | — | — |
| Hexahydrophthalic acid | (mol %) | — | — | 10 | 15 |

TABLE 1-continued

| Polyol components | | | | | |
|---|---|---|---|---|---|
| Ethylene glycol | (mol %) | 50 | — | 50 | 60 |
| Propylene glycol | (mol %) | — | 30 | — | — |
| Neopentyl glycol | (mol %) | 50 | — | — | 32 |
| 1,4-Cyclohexane-dimethanol | (mol %) | — | 70 | — | — |
| BPA-2.1 EO adduct* | (mol %) | — | — | 45 | — |
| Trimethylolpropane | (mol %) | — | — | 5 | 8 |
| Molecular weight | | 3,500 | 2,200 | 4,000 | 3,500 |
| Softening point | (°C.) | 88 | 78 | 98 | 86 |
| Acid value | | 36 | 154 | 40 | 42 |

*This compound is an adduct of 2,2-bis(4-hydroxyphenyl)-propane with ethylene oxide (avarage 2.1 mol) at both terminal ends of the diol.

TABLE 2

| | Example Nos. | | | | | Comparative Example Nos. | | | |
|---|---|---|---|---|---|---|---|---|---|
| Ingredients | 1 | 2 | 3 | 4 | 5 | 1 | 2 | 3 | 4 |
| | parts | | | | | parts | | | |
| Polyester resins | | | | | | | | | |
| A | 600 | — | — | — | 850 | 600 | — | — | 500 |
| B | — | 300 | — | — | — | — | 300 | — | — |
| C | — | — | 900 | — | — | — | — | 900 | — |
| D | — | — | — | 900 | — | — | — | — | — |
| Epoxy resins | | | | | | | | | |
| Epikote 1004 | 400 | — | — | — | — | 400 | — | — | 500 |
| ZX-121* | — | 700 | — | — | — | — | 700 | — | — |
| Glycidyl p-glycidyl-oxybenzoate | — | — | 100 | — | — | — | — | 100 | — |
| Diglycidyl tere-phthalate | — | — | — | 100 | — | — | — | — | — |
| Triglycidyl iso-cyanurate | — | — | — | — | 150 | — | — | — | — |
| Catalysts | | | | | | | | | |
| Bis(tetraethylammonium) terephthalate | 3 | — | — | — | — | — | — | — | — |
| Tetramethylammonium benzoate | — | 2 | — | — | 2 | — | — | — | — |
| Tetramethylammonium acetate | — | — | 3 | — | — | — | — | — | — |
| Bis(trimethylbenzyl-ammonium) isophthalate | — | — | — | 5 | — | — | — | — | — |
| Tetraethylammomium chloride | — | — | — | — | — | — | 2 | — | — |
| Tetramethylammonium bromide | — | — | — | — | — | — | — | 3 | — |
| Dimethylbenzylamine | — | — | — | — | — | — | — | — | 5 |

*ZX-121 is an epoxy resin produced by Toto Kasei Co., Ltd.

TABLE 3

| | Example Nos. | | | | | Comparative Example Nos. | | | |
|---|---|---|---|---|---|---|---|---|---|
| Properties | 1 | 2 | 3 | 4 | 5 | 1 | 2 | 3 | 4 |
| Smoothness | O | Δ-O | O | Δ-O | O | O | X | Δ | O |
| Gloss (%) | 95 | 92 | 97 | 92 | 95 | 95 | 76 | 81 | 92 |
| Browning | O | O | O | Δ-O | O | O | Δ | Δ-X | X |
| Erichsen test (mm) | 7 | 7 | 7 | 7 | 7 | 0.5 | 7 | 7 | 0.5 |
| Impact strength (½" × kg × cm) | 40 | 35 | 40 | 50 | 35 | 5 | 25 | 25 | 10 |

EXAMPLES 6 TO 8

In the same manner as described in Example 1, the above polyester resin (A), (C) or (D) was compounded with the epoxy resin and the catalyst listed in Table 4 and the resulting powder coating composition was applied onto a mild steel plate and baked. The properties of the film thus obtained are shown in Table 5.

TABLE 4

| | Example Nos. | | |
|---|---|---|---|
| | 6 | 7 | 8 |
| Ingredients | parts | | |
| Polyester resins | | | |
| A | — | — | 910 |
| C | 860 | — | — |
| D | — | 880 | — |
| Epoxy resins | | | |
| Diglycidyl sebacate | 140 | — | — |
| Diglycidyl ether of 1,4-cyclohexane dimethanol | — | 120 | — |
| Ethylene glycol diglycidyl ether | — | — | 90 |
| Catalysts | | | |
| Tris(tetraethylammonium) trimellitate | 3 | — | — |
| Tetramethylammonium benzophenonetetracarboxylate | — | 3 | — |
| Trimethylbenzylammonium salt of the oligo ester of benzophenonetetracarboxylic acid and ethylene glycol (Formula [I], n = 6, m = 4) | — | — | 5 |

TABLE 5

| Properties | Example Nos. | | | |
|---|---|---|---|---|
| | 14 6 | 7 | 8 | |
| Smoothness | O | O | Δ-O | |
| Gloss (%) | 88 | 86 | 90 | |
| Browning | O | O | Δ-O | |
| Erichsen test (mm) | 7 | 7 | 7 | |
| Impact strength (½" × kg × cm) | 40 | 35 | 35 | |

EXAMPLES 9 AND 10

Glycidyl methacrylate (30 parts), styrene (20 parts), butyl methacrylate (60 parts) and methyl methacrylate (80 parts) were mixed and the mixture was slowly added to toluene (200 parts) at 80° and 90° C. and vigorously stirred for 3 hours under nitrogen atmosphere. To the mixture was added 2,2'-azobis(2-methylpropionitril) (11 parts) in acetone (10 parts) over 30 minutes and the reaction was continued for 2 hours. After completion of the reaction, the polymer solution thus obtained was diluted with acetone (200 parts) and solidified in hexane (2,000 parts) to obtain white powder. The powder was dried at 55° C. for 24 hours to obtain an acrylic resin having a molecular weight of 3,300 and an epoxy equivalent of 1,000.

In the same manner as described in Example 1, the above obtained epoxy groups-containing acrylic resin (900 parts), sebacic acid (100 parts), rutile titanium dioxide (400 parts), Polyflow-S (5 parts) and tetramethylammonium salt of an acrylic resin of acrylic acid-ethyl acrylate (molar ratio, 1:2) having a molecular weight of 2,000 and an acid value of 176 (formula [I], n=7, m=5) (4 parts) were mixed by Henschel mixer to obtain a powder coating composition and the composition was applied onto a mild steel plate.

The above procedure was repeated by using tetramethylammonium salt of an acrylic resin having a molecular weight of 72,000 and an acid value of 773 (formula [I], n=1,000, m=800)instead of the above tetramethylammonium salt of an acrylic resin (formula [I], n=7, m=5).

The properties of each the resulting film are shown in Table 6.

TABLE 6

| Properties | Example Nos. | |
|---|---|---|
| | 9 | 10 |
| Smoothness | Δ-O | Δ-O |
| Gloss (%) | 88 | 82 |
| Browning | O | O |
| Erichsen test (mm) | 7 | 7 |
| Impact strength (½" × kg × cm) | 30 | 30 |

EXAMPLE 11

In the same manner as described in Example 1, the above polyester resin (A) (700 parts) was compounded with a condensation product of diglycidyl ether of 2,2-bis(4-hydroxyphenyl)propane (2 mol) and tetraphthalic acid (1 mol) having an epoxy equivalent of 430 (300 parts) and bis(tetraethylammonium) terephthalate (3 parts) to obtain a powder coating composition and the composition was applied onto a mild steel plate. The properties of the resulting film are shown in Table 7.

TABLE 7

| Properties | Example 11 |
|---|---|
| Smoothness | O |

TABLE 7-continued

| Properties | Example 11 |
|---|---|
| Gross (%) | 95 |
| Browning | O |
| Erichsen test (mm) | 7 |
| Impact strength (½" × kg × cm) | 50 |

What is claimed is:

1. A powder coating composition which comprises:
   (a) a compound having at least two epoxy groups in the molecule;
   (b) a polyester or acrylic resin having a molecular weight of 1,000 to 7,000 and an acid value of not less than 20 having at least two carboxyl groups; and
   (c) a compound of the formula:

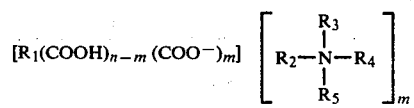

wherein m and n are each an integer of from 1 to $10^5$ provided that m≦n; $R_1$ is a residue of a mono or polybasic carboxylic acid (the number of the carboxyl groups n=1 to $10^5$); and $R_2$, $R_3$, $R_4$, and $R_5$ are, the same or different, each being an alkyl group having 1 to 30 carbon atoms substituted with a halogen, nitro group, an alkoxy group having 1 to 4 carbon atoms or furyl; a cycloalkylalkyl group having 6 to 10 carbon atoms; a cycloalkyl group having 5 to 8 carbon atoms substituted with a halogen, nitro group, an alkyl group having 1 to 4 carbon atoms, an alkoxy group having 1 to 4 carbon atoms or furyl; an aryl group having 6 to 20 carbon atoms, or a substituted aryl group having 6 to 20 carbon atoms substituted with a halogen, nitro group, an alkyl group having 1 to 4 carbon atoms, an alkoxy group having 1 to 4 carbon atoms or furyl; or an aralkyl group having 7 to 30 carbon atoms substituted with a halogen, nitro group, an alkyl group having 1 to 4 carbon atoms, an alkoxy group having 1 to 4 carbon atoms or furyl; or at least two of $R_2$ to $R_5$ forming, together with the nitrogen atom, a saturated or unsaturated heterocyclic group.

2. A powder coating composition according to claim 1, wherein $R_1$ of the compound of the formula [I] is a residue of a carboxylic acid having 1 to 10 carboxyl groups.

3. A powder coating composition according to claim 2, wherein $R_1$ of the compound of the formula [I] is a residue of a carboxylic acid having 1 to 4 carbon atoms.

4. A powder coating composition according to claim 3, wherein $R_1$ of the compound of the formula [I] is a residue of an aromatic dicarboxylic acid having 8 to 22 carbon atoms.

5. A powder coating composition according to claim 3, wherein $R_1$ of the compound of the formula [I] is a residue of acetic acid, propionic acid, trimellitic acid or benzoic acid.

6. A powder coating composition according to any one of claims 1, 2, 3, 4 or 5, wherein $R_2$, $R_3$, $R_4$ and $R_5$ of the compound of the formula [I] are, the same or different, each an alkyl group having 1 to 30 carbon atoms or an aralkyl group having 7 to 30 carbon atoms.

7. A powder coating composition according to claim 6, wherein $R_2$, $R_3$, $R_4$ and $R_5$ of the compound of the formula [I] are, the same or different, each methyl, ethyl or benzyl.

8. A powder coating composition according to claim 6, wherein the compound having at least two epoxy groups is a polyepoxy compound having a molecular weight of 200 to 5,000 and an epoxy equivalent of not more than 2,500.

9. A powder coating composition according to claim 8, wherein the compound having at least two epoxy groups is a reaction product of an aromatic polyhydroxy compound having 6 to 27 carbon atoms and epichlorohydrin.

10. A powder coating composition according to claim 8, wherein the compound having at least two epoxy groups is a condensation product of an aromatic polycarboxylic acid having 8 to 22 carbon atoms and epichlorohydrin.

11. A powder coating composition according to claim 8, wherein the compound having at least two epoxy groups is a reaction product of a hydroxy-substituted aromatic carboxylic acid having 7 to 28 carbon atoms and epichlorohidrin.

12. A powder coating composition according to claim 8, wherein the compound having at least two epoxy groups is a nitrogen-containing epoxy compound.

13. A powder coating composition according to claim 8, wherein the compound having at least two carboxyl groups is an aliphatic dicarboxylic acid having 4 to 36 carbon atoms.

14. A powder coating composition according to claim 1, wherein the composition contains 0.01 to 10% by weight of the compound of the formula [I] based on the amount of the compound having at least two epoxy groups.

15. A powder coating composition according to claim 1, wherein the ratio of the epoxy compound to the carboxyl groups-containing compound in the composition is selected so that the ratio of the epoxy groups to the carboxyl groups becomes within the range of $0.5 <$ epoxy groups/carboxyl groups $< 2.0$.

* * * * *

UNITED STATES PATENT AND TRADEMARK OFFICE
CERTIFICATE OF CORRECTION

PATENT NO. : 4,255,553
DATED : March 10, 1981
INVENTOR(S) : Yutaka MIZUMURA, Iori NAITO and Hideo MIYAKE It is certified that error appears in the above-identified patent and that said Letters Patent are hereby corrected as shown below:

Column 14, line 2, "epichlorohidrin" should read --epichlorohydrin--.

Signed and Sealed this

Sixteenth Day of June 1981

[SEAL]

Attest:

RENE D. TEGTMEYER

*Attesting Officer*   *Acting Commissioner of Patents and Trademarks*